US009065827B1

(12) United States Patent
Taylor et al.

(10) Patent No.: US 9,065,827 B1
(45) Date of Patent: *Jun. 23, 2015

(54) BROWSER-BASED PROVISIONING OF QUALITY METADATA

(75) Inventors: Brett R. Taylor, Bainbridge Island, WA (US); Ameet N. Vaswani, Seattle, WA (US); Faizal S. Kassamali, Kirkland, WA (US); Ryan Tucker, Shoreline, WA (US); Ranganath Atreya, Kirkland, WA (US); Michael V. Zampani, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 188 days.

This patent is subject to a terminal disclaimer.

(21) Appl. No.: 13/588,928

(22) Filed: Aug. 17, 2012

(51) Int. Cl.
*G06F 15/173* (2006.01)
*H04L 29/06* (2006.01)

(52) U.S. Cl.
CPC .............. *H04L 63/10* (2013.01); *H04L 65/403* (2013.01)

(58) Field of Classification Search
CPC . H04L 63/10; H04L 65/403; G06F 17/30861; G06F 17/30864; G06F 17/30899
USPC .......................................... 709/203, 224–226
See application file for complete search history.

(56) References Cited

U.S. PATENT DOCUMENTS

| 5,802,361 | A | 9/1998 | Wang et al. |
| 6,670,968 | B1 | 12/2003 | Schilit et al. |
| 7,047,502 | B2 | 5/2006 | Petropoulos et al. |
| 7,159,023 | B2 | 1/2007 | Tufts |
| 7,373,313 | B1 | 5/2008 | Kahle et al. |
| 7,680,703 | B1 | 3/2010 | Smith |
| 7,716,199 | B2 | 5/2010 | Guha |
| 7,756,903 | B2 | 7/2010 | Kumar |
| 7,881,984 | B2 | 2/2011 | Kane, Jr. et al. |
| 7,913,185 | B1 | 3/2011 | Benson et al. |
| 7,941,535 | B2 | 5/2011 | Sherrets et al. |
| 7,975,020 | B1 | 7/2011 | Green et al. |
| 8,145,512 | B1 | 3/2012 | Henne et al. |
| 8,381,096 | B2 * | 2/2013 | Yerubandi et al. ............ 715/238 |
| 2004/0141016 | A1 | 7/2004 | Fukatsu et al. |
| 2006/0036966 | A1 * | 2/2006 | Yevdayev ..................... 715/779 |
| 2009/0172021 | A1 | 7/2009 | Kane et al. |
| 2009/0234814 | A1 | 9/2009 | Boerries et al. |

(Continued)

OTHER PUBLICATIONS

Schafer, E-Commerce Recommendation Applications, paper, Jan. 2001, 115-153, vol. 15, Issue 1-2, Data Mining and Knowledge Discovery Journal, Kluwer Academic Publishers, Hingham, MA.

(Continued)

*Primary Examiner* — Duyen Doan
(74) *Attorney, Agent, or Firm* — Knobbe, Martens, Olson & Bear, LLP

(57) ABSTRACT

Various features are disclosed for generating and presenting users with resource metadata regarding the usefulness or predicted usefulness of particular pages, sites, and/or other network resources. The metadata may be based partly or wholly on the monitored browsing behaviors of many users, including behaviors reflective of whether particular resources were useful to the users. The metadata may, in some cases, be personalized for particular users based, for example, on their browsing environments or contexts. For example, the metadata presented to a smartphone user regarding a particular link may reflect a determination of whether the target resource is well suited for display on smartphones generally or on the user's particular model of smartphone.

21 Claims, 10 Drawing Sheets

(56) References Cited

U.S. PATENT DOCUMENTS

| | | |
|---|---|---|
| 2009/0282000 A1 | 11/2009 | Bennett |
| 2009/0287683 A1* | 11/2009 | Bennett ............................ 707/5 |
| 2010/0169177 A1* | 7/2010 | Griffith et al. ............. 705/14.53 |
| 2011/0022945 A1* | 1/2011 | Yang ............................ 715/234 |
| 2011/0184936 A1* | 7/2011 | Lymberopoulos et al. ... 707/721 |
| 2011/0320957 A1* | 12/2011 | Tiddens ........................ 715/747 |
| 2012/0010920 A1 | 1/2012 | Yuan |
| 2012/0023390 A1* | 1/2012 | Howes et al. ................. 715/205 |
| 2012/0137201 A1* | 5/2012 | White et al. .................. 715/205 |
| 2012/0185891 A1 | 7/2012 | Conradt et al. |
| 2012/0191841 A1* | 7/2012 | Swamidas et al. ........... 709/224 |
| 2013/0246383 A1* | 9/2013 | White et al. .................. 707/706 |
| 2013/0290820 A1* | 10/2013 | Dhanani ........................ 715/205 |
| 2014/0164404 A1* | 6/2014 | Hunt et al. .................... 707/754 |

OTHER PUBLICATIONS

Weinreich, Concepts for Improved Visualization of Web Link Attributes, paper, Jun. 2000, 403-416, vol. 33, Issue 1-6, Computer Networks: The International Journal of Computer and Telecommunications Networking, Elsevier North-Holland, Inc., New York, NY.

Kopetzky, Visual preview for link traversal of the World Wide Web, paper, 1999, 1525-1532, vol. 32, Issue 11-16, Computer Networks, Elsevier Science B.V., New York, NY.

* cited by examiner

BROWSER-BASED PROVISIONING OF QUALITY METADATA

BACKGROUND

A variety of tools and services exist for enabling network users to view information or "metadata" regarding the web pages, web sites, and other network resources they access. For example, a variety of browser toolbars exist that retrieve and display information regarding the page or site currently being viewed. This information may include, for example, a traffic ranking of the site, a categorization of the site, and a list of related sites or pages. Tools also exists for enabling a user to, prior to following a link, view a preview (such as a thumbnail image) of the page to which the link points. The preview is typically displayed when the user hovers a mouse pointer over the link.

Although these tools are sometimes helpful, they frequently do not provide users with sufficiently useful information for making informed decisions about whether to access particular pages or other network resources. In addition, many existing tools require the user to download and install a special browser plug-in, or only provide metadata for a very limited set of pages or sites.

BRIEF DESCRIPTION OF DRAWINGS

The accompanying drawings, which are incorporated in and form a part of this specification, illustrate example embodiments of the inventive subject matter, and in no way limit the scope of protection. The accompanying drawings include examples of possible graphical user interfaces for use with the disclosed system and methods. Other embodiments are contemplated using alternate hardware and/or software platforms, and using significantly different interfaces. The accompanying drawings illustrate embodiments wherein.

DETAILED DESCRIPTION

Various features are disclosed for generating and presenting users with resource metadata regarding the usefulness or predicted usefulness of particular pages, sites, and/or other network resources. The metadata may be based partly or wholly on the monitored browsing behaviors of many users, including behaviors reflective of whether particular resources were useful to the users. The metadata may, in some cases, be personalized for particular users based, for example, on their browsing environments or contexts. For example, the metadata presented to a smartphone user regarding a particular link may reflect a determination of whether the target resource is well suited for display on smartphones generally or on the user's particular model of smartphone. As another example, if a user has a relatively low bandwidth connection, the metadata presented to the user for a particular link may reflect whether the target resource is suitable for viewing over a low bandwidth connection. The type or types of metadata presented for particular links may vary depending upon the type or category of the target resource.

The metadata may be presented in association with specific links, such that the user can consider the metadata in deciding whether to follow a link. In some embodiments, the metadata may be injected onto the page by an intermediary system or proxy server, such that no special metadata client is needed on the user's device. Embodiments are also disclosed in which a special browser or browser plugin retrieves the metadata from a metadata service. In yet other embodiments, an Internet search engine system may embed metadata on search results pages for particular search results/links included on the page.

Figure 1:
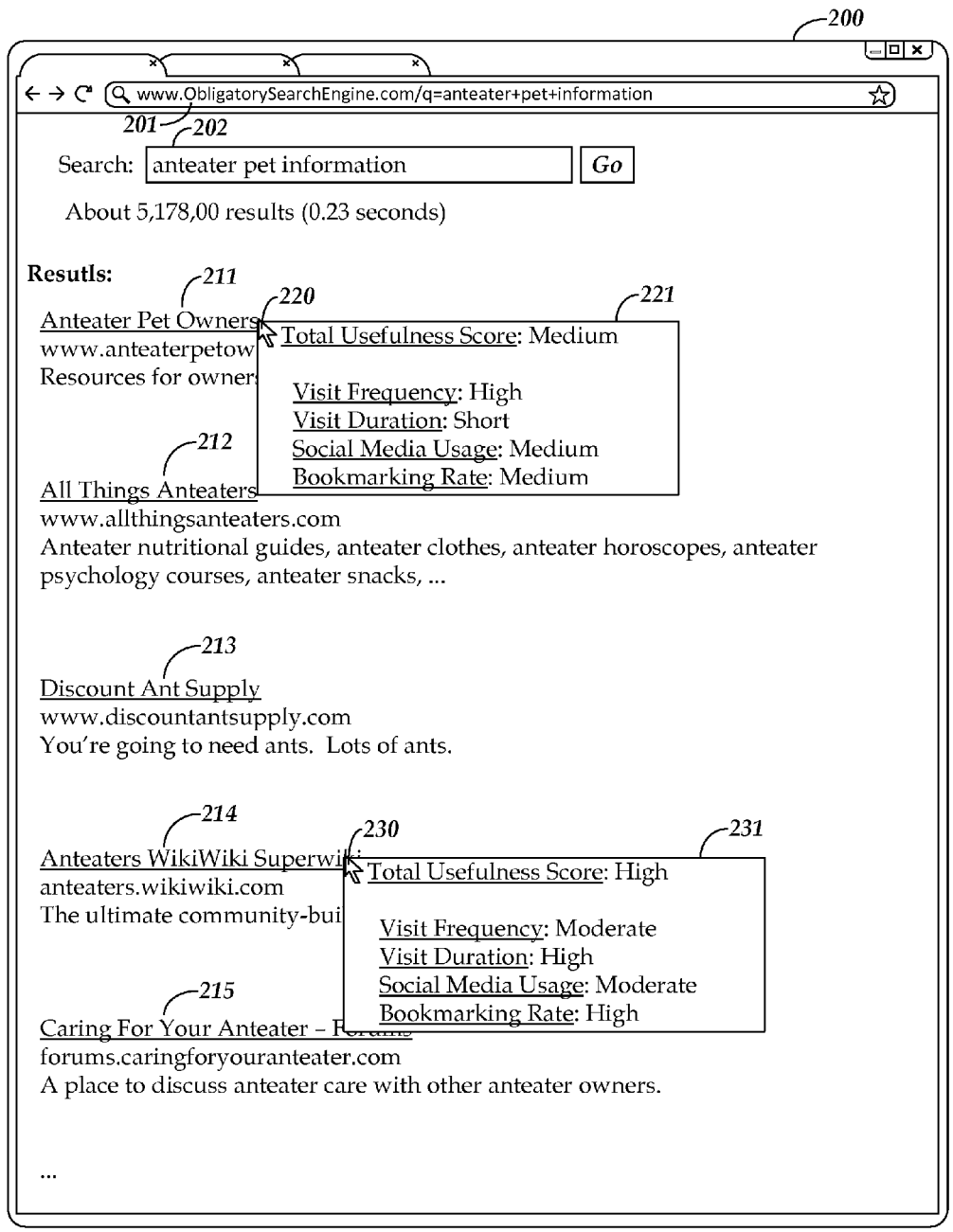
FIG. 1 illustrates one example of a graphical user interface with usefulness metadata for items contained in a network resource. The usefulness metadata is presented in a pop-up triggered by a mouse-over user input event.

According to one embodiment, the system provides the user with metadata related to the expected usefulness of various items while using the web browser. For example, referring to FIG. 1, a service provides the user with a popup panel 221, 231 with metadata 221 when the user mouses-over 220 a hyperlink in the illustrated search results, as shown for two representative hyperlinks 211 and 214 in the drawing. It will be understood that the illustration of FIG. 1 shows a cursor icon at two different locations 220, 230, representing two different periods of time. The illustrated embodiment provides the user with a variety of usefulness metadata for both hyperlink items 211, 214. The system thereby permits the user to efficiently identify that a lower-ranked search result 214 has a higher expected usefulness than a higher ranked search result 211 shown in this example. In certain embodiments, the system personalizes the usefulness metadata based on a user identity, user profile, browsing environment, past activity, and/or demographic information. Various other types of metadata may additionally or alternatively be presented, including metadata reflective of suitability of the target resource for viewing on the user's particular computing device (as may be determined based on behaviors of users with similar devices).

Figure 9:
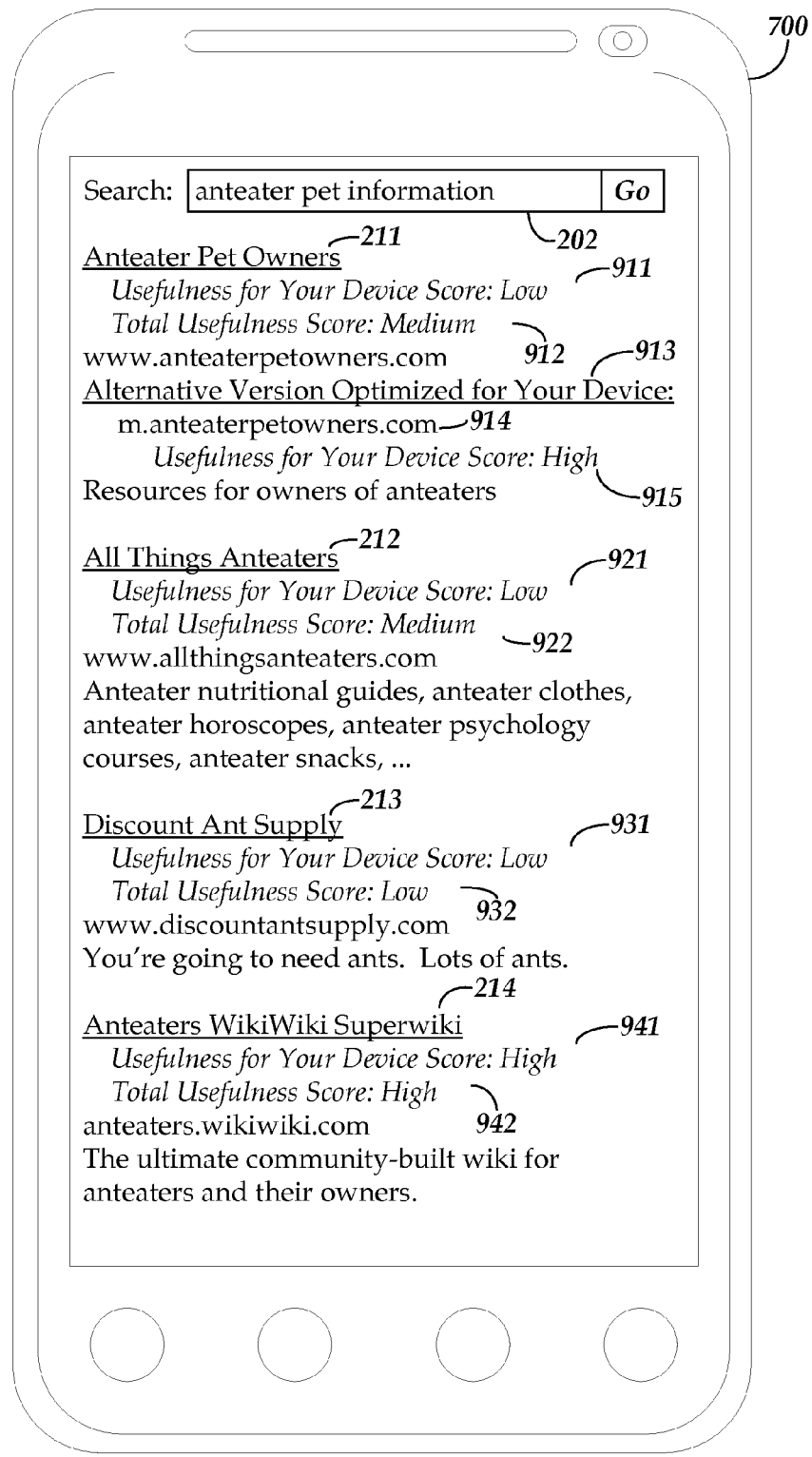
FIG. 9 illustrates a graphical user interface of a client device with usefulness metadata provided based at least in part on attributes of the client device.

Metadata panels or popovers 221, 231 of the type shown in FIG. 1 may be added to pages (including but not limited to search result pages) in various way. As one example, a proxy server or other intermediary system may, during the retrieval of a page, augment the page with JavaScript (or other browser-executable code) and associated metadata for displaying the panels in response to mouse-over events. As another example, the browser or a browser plug-in may retrieve, from a metadata service, the metadata associated with particular links on a page being viewed by the user, and may make this metadata available for viewing. As another example, and as mentioned above, an Internet search engine system could include metadata of the type shown in FIG. 1 on the search results pages it generates. The metadata may also be presented to users without the use of panels or popovers; for example, as shown in FIG. 9 (discussed below), the metadata may be displayed inline with other page content.

Usefulness Metadata

Various embodiments of the disclosed system use one or more metrics related to usefulness metadata. These usefulness metrics provide different ways of measuring an expected usefulness of an item, such as a webpage, that is electronically referenced in a network resource—such as being the target of a hyperlink within that webpage. As one example, the embodiment shown in FIG. 1 presents usefulness metadata based on "total usefulness score," "visit frequency," "visit duration," "social media usage," and "bookmarking rate." Visit frequency in this example refers to a measurement of the number of user visits to the item—in this case the website that is the target of the hyperlink. For example, a site associate with the hyperlink "Anteater Pet Owners" 211 has a "High" visit frequency 221, while the site associated with the hyperlink "Anteaters WikiWiki Superwiki" 214 has a "Medium" visit frequency 231. In the present example, this indicates that the system stores data recording more visits from users to the "Anteater Pet Owners" webpage than to the "Anteaters Wiki-Wiki Superwiki" webpage.

One example of an item that is the subject of metadata is a particular webpage, such as an HTML file accessible at a specific URL. Another example of an item that is the subject of metadata is a more general network location, such as an Internet domain address, including all sub-locations such as HTML files accessible at various URLs within that domain address.

As another example, an item may be a specific hyperlink encoded in a webpage, rather than the destination of the hyperlink. In this example, if webpage A includes a hyperlink to webpage C, and webpage B also includes a hyperlink to webpage C, the system provides different metadata associated with the usefulness of the hyperlink on webpage A, as compared to the metadata associated with the usefulness of the hyperlink on webpage B. For example, an embodiment may store usefulness metadata indicating that a hyperlink from a cooking recipes page, to a cookbook review website, is more useful than is a hyperlink from a photography website, to the same cookbook review website. (This discrepancy may, for example, be based on an automated observation that users who access the target site from the cookbook review site tend to spend more time browsing it than users who access the cookbook review site from the photography site.) In contrast, another embodiment stores usefulness metadata for webpage C itself, and presents the same usefulness metadata for a hyperlink on webpage A as it does for a hyperlink on webpage B, when both refer to webpage C. In yet another embodiment a combination is used, where usefulness metadata is based on both the general usefulness of the webpage targeted by the hyperlink, as well as the specific webpage that the hyperlink is embedded within.

Referring again to FIG. 1, the illustrated embodiment includes functionality related to selective display of usefulness metadata. For example, the present embodiment may provide usefulness metadata pop-up panels in some situations, and not in others. The system may detect that the web browser 200 is viewing a network resource provided by a search engine, and may provide usefulness metadata pop-up panels when the user is viewing search results, but not provide usefulness metadata pop-up panels at other times. In this example, the system detects the current address 201 being accessed by the browser. If the browser 200 is currently viewing a network address within a domain recognized by the system, the system provides usefulness metadata pop-up panels. In another embodiment, the system provides usefulness metadata unless the user is viewing a network resource that the system has identified as being excluded from usefulness metadata pop-up panels. In another embodiment, the system determines whether it has access to metadata for the target of a link currently being displayed.

The present embodiment also provides usefulness metadata based on visit duration. A network resource, such as website, that users spend longer periods of time viewing may be correlated with being a more useful network resource item. This may occur because the website or other item includes a larger quantity of content, a higher usefulness of content, a more useful format, and/or better performance such as bandwidth for delivery. On the other hand, if a particular item receives very short visits that may indicate lower usefulness. The illustrated embodiment may gather visit duration data through one or more approaches. For example, a software service may detect the amount of time that a network browser was displaying a particular network resource, such as a website. As another example, a browser plug-in may detect the amount of time that a particular browser tab was in focus, or what portion of a webpage a user has spent the most time viewing. As with other behavioral metrics described herein, visit duration for particular sites, pages, and other resources may be monitored both generally and for particular classes of users and devices (e.g., smartphone users, tablet users, PC users, users of particular demographics, users of a particular region, etc.) such that personalized or customized metadata may be presented to users.

Social media usage is another usefulness metadata metric shown in the embodiment of FIG. 1. The system may associate a user's social media actions related to a particular network resource or item as indicating usefulness. For example, a user may click a Facebook "like" button on a webpage in order to "like" the webpage with their Facebook account. Similarly, a user may show interest in a network resource using their Google+ account by clicking a +1 button associated with the network resource. As another example, a user may transmit a Twitter tweet containing a link to a network resource, such as a webpage URL, an image URL, or an abbreviated URL associated with the network resource.

It will be understood that in various embodiments, usefulness may be measured at the granular level of a network resource, such as a webpage. Additionally or alternatively, usefulness may be measured at a more granular level of an item referenced in or by a network resource, with examples including (1) an image referenced in the HTML source of a webpage, (2) a particular hyperlink from one webpage to another, (3) a portion of a webpage, and (4) a particular post in an online forum discussion. As yet another example, usefulness may be measured at a less granular level such as at an address domain level, subdomain level, directory or subdirectory, or some other scope. For example, some embodiments may detect the current URL 201 of a client browser application 200, or detect particular terms having been searched for 202. This may be used to provide usefulness metadata 221, 231, for some or all search results 221-215, or other examples of network resources.

The embodiment of FIG. 1 also presents usefulness metadata based on a bookmarking rate. For example, the system may maintain data corresponding to the frequency or total quantity of times that users bookmark a particular network resource. Examples of bookmarking including adding a webpage as a bookmark to a network browser, adding a webpage to a bookmark service account such as del.icio.us, and adding a bookmark to a synchronized Google bookmarking account.

The present embodiment additionally provides a total usefulness score. In the present embodiment, total usefulness is determined based on a combination of individual usefulness metrics, such as visit frequency, visit duration, social media usage, and bookmarking rate. A total usefulness score may be calculated using a weighted average algorithm or some other determination.

Another embodiment of a system providing usefulness metadata determines usefulness based at least in part on comparing bounce-back vs. link-out rates in user behavior. In such an example, a bounce-back event occurs when a user views a network resource and then returns back to their previous network browsing location. By comparison, a link-out event occurs when a user views a network resource and then follows a network link to another network resource. The system may consider a high ratio of bounce-backs as compared to link-outs for a particular resource as indicating that the resource has a lower expected usefulness.

In another embodiment, a system for providing usefulness metadata may additionally or alternatively use other usefulness metrics. For example, a system may gather data based on local user actions relative to the network browser, including zooming in and/or out from portions of a network resource, panning to portions of a network resource, printing the network resource, saving a copy of the network resource to the user's local computer, placing an application such as a web browser into a reading mode while viewing the network resource, and/or other actions occurring within a network browser which might not generate any network traffic.

As is discussed in greater detail elsewhere in the present disclosure, some embodiments use a local service operating on the user's computing device to gather behavioral data that is used to generate the usefulness metadata. In some embodiments, a gathering service is used in order to detect and record such local user input activities. In other embodiments, usefulness metadata is gathered at a location between the source of the network resource for which usefulness metadata is being gathered and the client computer device. For example, a proxy server may act as an intermediary between the client and destination Internet sites, and may gather usefulness metadata based on that proxy behavior.

The embodiment in FIG. 1 displays usefulness metadata metrics using a descriptive scale using terms such as "High," "Medium," "Moderate," and "Short." 221, 231. Alternatively or additionally, other representations may be used to provide information regarding expected usefulness. For example, quantitative values such as a total score may be provided. As another example, the system may provide usefulness metadata in the form of a rating scale from one to five. Such a rating may be presented numerically, graphically (e.g., a 4 out of 5 star rating using images), or through some other representation.

Client Usefulness Metadata Provision Service

Figure 2A:
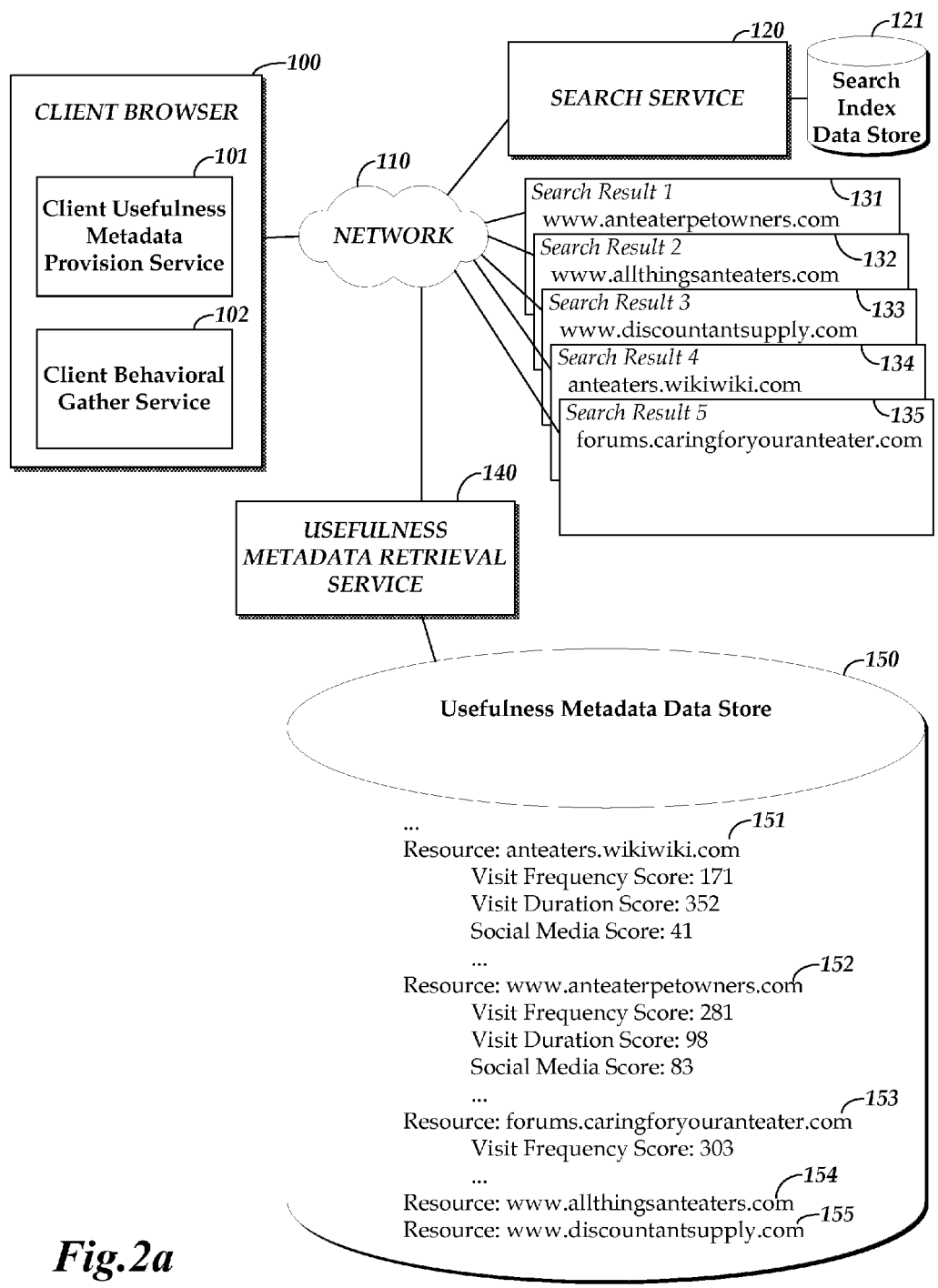
FIG. 2a depicts one embodiment of a system for providing usefulness metadata to the user of a client browser. The client browser includes a usefulness metadata provision service which provides the usefulness metadata to the user.

Referring to FIG. 2a, there is shown an embodiment of a system for providing usefulness metadata to the user of a computing device, in addition to elements of the network environment in which the system may operate. The client browser 100 in this example is a network browser such as Amazon Silk, Google Chrome, Apple Safari, Opera, Mozilla Firefox, or Microsoft Internet Explorer. The client browser in the illustrated embodiment includes a client usefulness metadata provision service 101 that provides usefulness metadata to the user. The usefulness metadata provision service may provide the usefulness metadata by providing a modified user interface, such as the user interface of FIG. 1 which includes usefulness metadata pop-up panels in response to mouse-over events.

The usefulness metadata provision service may operate as a default component of the client browser 100. As another example, the client usefulness metadata provision service 101 is a plug-in, add-on, or extension to the client browser 100. As another example, the client usefulness metadata provision service 101 operates as a separate process and interacts with the client browser 100 through an API. As another example, the client usefulness metadata provision service 101 operates as a proxy service on the client device and modifies a network resource's source data before it is received by the client browser 100. For example, a local proxy client usefulness metadata provision service 101 may inject HTML-formatted content into an HTML network resource transmitted to the client browser, before that HTML content reaches the client browser.

Client Usefulness Metadata Retrieval Service

The client usefulness metadata provision service 101 of the illustrated embodiment obtains usefulness metadata from a usefulness metadata retrieval service 140 accessible through a network 110. In one example, the network 110 is the Internet. There may be a number of client computing devices with client usefulness metadata provision services 101 which obtain usefulness metadata from a single usefulness metadata retrieval service 140. In the example of FIG. 2a, the usefulness metadata provision service 101 transmits one or more requests to the usefulness metadata retrieval service 140, in order to obtain usefulness metadata from the usefulness metadata retrieval service 140.

In one example, the client usefulness metadata provision service 101 transmits a request to the usefulness metadata retrieval service 140 using an on-demand basis. The client usefulness metadata provision service 101 detects a user input action associated with a particular item referenced by a network resource. For example, the client usefulness metadata provision service 101 may detect a mouse-over event in which a cursor is positioned over, or near, an item such as a hyperlink. The client usefulness metadata provision service 101 may transmit a request to the usefulness metadata retrieval service 140, the request identifying the hyperlink, in response to the user input action. The usefulness metadata retrieval service 140 may provide the client usefulness metadata provision service 101 with usefulness metadata in response to the request, and the client usefulness metadata provision service 101 may provide the usefulness metadata to the user, for example through a user interface. This type of on-demand request for usefulness metadata may reduce the total number of requests but may introduce some latency between a user input action and the user system providing the user with usefulness metadata.

In another example, the client usefulness metadata provision service 101 obtains usefulness metadata on a pre-fetch basis. For example, the client usefulness metadata provision service 101 may detect that the client browser 100 has loaded a new network resource, such as a webpage. The client usefulness metadata provision service 101 may identify one or more items referenced in the network service, such as hyperlinks corresponding to search results. The client usefulness metadata provision service 101 may transmit one or more requests for client usefulness metadata to the usefulness metadata retrieval service 140. The client usefulness metadata provision service 101 may then cause the usefulness metadata received in response to those requests to be stored on the computing device, such as in a local usefulness metadata cache. The client usefulness metadata service 101 then detects a client input event, such as a mouse-over, and obtains the stored client usefulness metadata from the local cache rather than transmit a request to the usefulness metadata retrieval service 140 in response to the input action.

The usefulness metadata retrieval service 140 shown in FIG. 2a is in communication with a usefulness metadata data store 150. Examples of usefulness metadata data stores include databases, flat files, file systems, directory structures, or other data storage system. For example the usefulness metadata store 150 may be a SQL database, and the usefulness metadata retrieval service 140 may communicate with the usefulness metadata store 150 using database queries.

As shown, the usefulness metadata data store 150 includes usefulness metadata associated with a number of network resources. It will be understood that in other examples, usefulness metadata is associated with other items, such as a file, particular hyperlink, forum post, product, or news article. The usefulness metadata data store 150 shown in FIG. 2a maintains an association between a particular resource and usefulness metadata associated with that resource. For example, the usefulness metadata data store 150 stores usefulness metadata associated with the resource anteaters.wikiwki.com 151. The usefulness metadata may be generated and/or updated periodically or continuously based on the latest behavioral data collected regarding user actions. In some examples, more recent behavioral data (e.g., the last day's worth, and/or the last hour's worth) may be given more weight than less recent behavioral data.

That usefulness metadata includes a visit frequency score, a visit duration score, and a social media score. In the usefulness metadata associated with these usefulness metrics are stored in numeric form, with values of 171 for visit frequency score, 352 for visit duration score, and 41 for social media score. These numeric values correspond to qualitative values 231 provided to the user in FIG. 1 for the Anteaters WikiWiki Superwiki search result 214. In other embodiments, usefulness metadata is stored in other formats and/or value scales. In the present example, a total usefulness score may be calculated dynamically from stored usefulness metadata values. In other examples, the usefulness metadata data store 150 stores a total usefulness score.

In one embodiment, the usefulness metadata retrieval service 140 is a software service configured to establish a TCP socket in response to a TCP SYN request from a client usefulness metadata provision service 101, and subsequently transmit usefulness metadata in the form of an extensible markup language over the TCP socket.

Client Usefulness Metadata Gather Service

A client behavioral data gather service 102 is also shown in the embodiment of FIG. 2. The client behavioral data gather service 102 gathers behavioral metadata on the client device based on user actions. Examples of a client behavioral data gather service 102 include a plug-in, add-on, or extension to the client browser 100. In one embodiment, the client behavioral data gather service 102 monitors user activity for events relative to resource usefulness. For example, the client behavioral data gather service 102 may detect a browser navigation action such as selecting a hyperlink or navigating a browser back to a previously viewed network resource. The client behavioral data gather service may determine the duration of a particular visit to a network resource, such as through calculating the difference in time from when a client browser 100 transmitted an HTTP request for a network resource, until the client browser was navigated back to its previously viewed network resource. The client behavioral data gather service 102 may also detect user input actions relevant to usefulness determinations. For example, the client behavioral data gather service 102 may detect that the client browser 100 has been placed into a reading mode optimized for text viewing. The client behavioral data gather service 102 may also detect that the client browser 100 has recorded a network resource address as a bookmark.

The usefulness metadata gather service 102 in the present example transmits the gathered usefulness metadata to the usefulness metadata retrieval service. The usefulness metadata retrieval service 140 stores the usefulness metadata in the usefulness metadata data store 150 so that it can later be retrieved and provided to users. The system may also include a usefulness metadata aggregation service that aggregates and analyzes usefulness metadata in the usefulness metadata data store 150. For example, the usefulness metadata aggregation service may calculate bulk and/or average usefulness metadata measures based on usefulness metadata gathered from a number of client computing devices. The aggregation may be performed by analyzing various usefulness data associated with a common network resource, or related network resources. For example, the system may aggregate usefulness metadata by averaging a visit duration score based on the visit durations of many different users as gathered on many different computing devices. In certain embodiments, separate metadata scores or metrics may be generated for different classes of users or user devices. Alternatively or additionally, the system may provide customized usefulness metadata based on a user's own past behavior, instead of or in addition to usefulness metadata based on aggregated behavior of other users. For example, the system may provide the user with the option of allowing the system to collect behavioral data that identifies characteristics of the user's typical browsing behavior, such as bounce-back rates, click-through rates, and other behaviors. The system may then inform the user that a particular resource, such as a hyperlink, is expected to be of particularly high usefulness for the user specifically.

Environment Services

FIG. 2a illustrates the system operating in a networking environment consisting of one more other services, objects, and/or data stores. For example, the client browser 100 communicates with a search service 120. The search service 120 may communicate with a search index data store 121 in order to provide search results to a search query transmitted by the client browser 100. In the present embodiment, the usefulness metadata data store 150 is distinct from the search index data store 121 and from the search service 120. The client usefulness metadata provision service 101 obtains usefulness metadata 150 from the usefulness metadata retrieval service 140 independently of the search service 120 and search index data store 121. It will be understood that the disclosed system may provide usefulness metadata in contexts other than search engines and search engine result pages. For example, the system can also provide metadata for display on other types of pages, including static pages.

For example, in the illustrated embodiment the search service 120 identifies five search results 131-135 in a priority order according to a relevance score determined by the search service 120. These search results, are shown in FIG. 1, in the relevance order provided by the search service. Referring again to FIG. 2a, the usefulness metadata store indicates that the resource associated with www.anteaterpetowners.com 152 has a frequency score that is higher than the frequency score of www.anteaters.wikiwiki.com 151, but has a visit duration score and social media score that are each lower than the respective scores of anteaters.wikiwiki.com 151. In this example, the search service 120 does not have access to visit duration data or social media score data. Accordingly, the search service 120 provided a search result relevance order based on a visit frequency. Usefulness metadata gathered through client behavioral data gather services operating on numerous client devices indicates that the total expected usefulness of anteater.wikiwiki.com is higher than that of www.anteaterpetowners.com, and the system provides the user with information concerning this expected usefulness. Referring to FIG. 1, the user may choose to navigate to Anteaters WikiWiki Superwiki 214 rather than Anteater Pet Owners 220.

Usefulness Metadata Injection

Figure 2B:
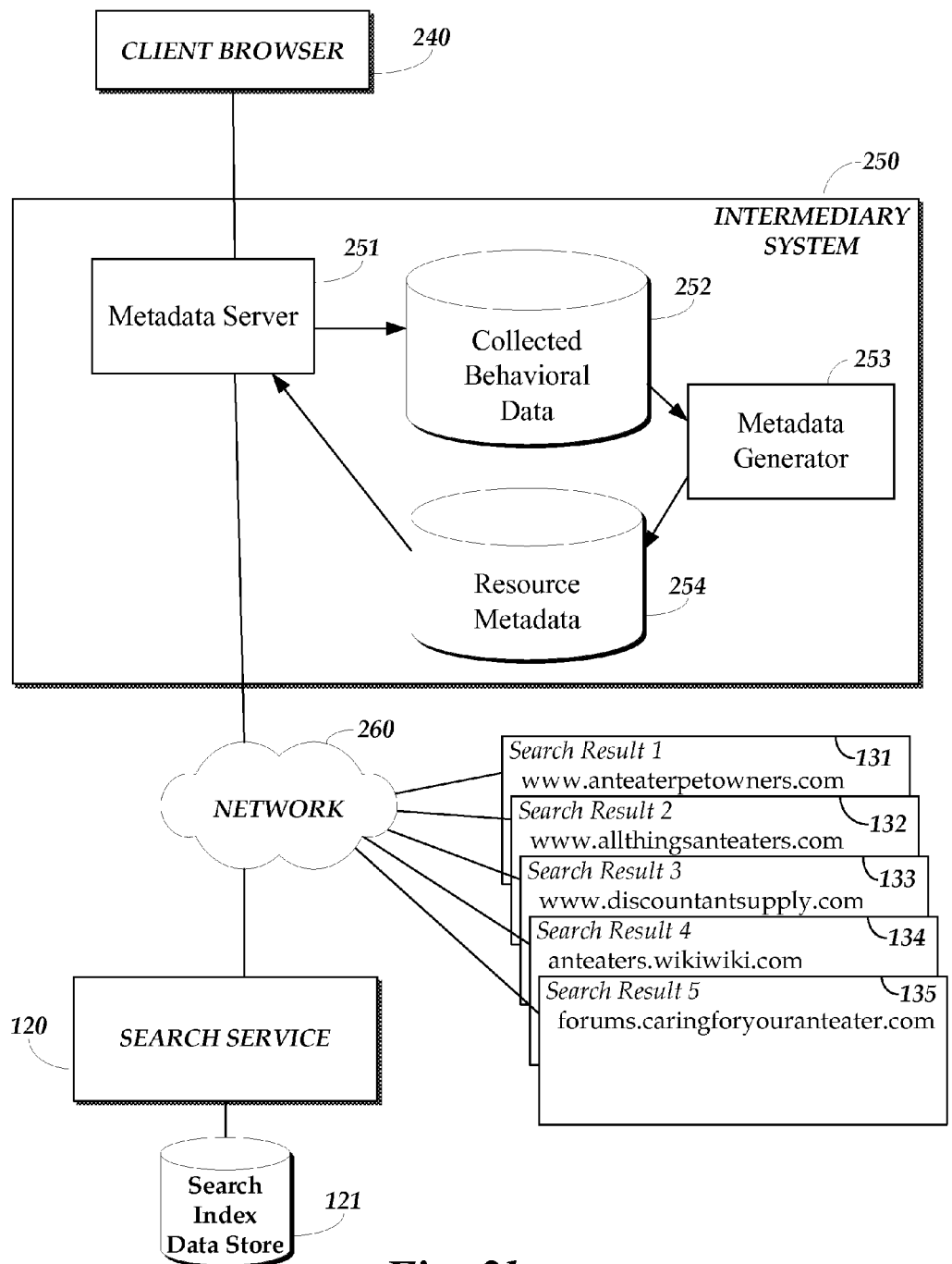
FIG. 2b depicts one embodiment of a system for injecting usefulness metadata into network content before it is received by a user.

Referring to FIG. 2b, there is shown an embodiment of a system for injecting metadata into content before the content is received by a user's browser 240. The client browser 240 of the current illustration does not include a service to augment a page with metadata. Instead, augmentation is performed by an intermediary system 240 located between the client browser 240 and the content that the client browser 240 requests. For example, in the present illustration the intermediary system 240 is located between the client browser 240 and a search service 120, in addition to the content associated pages 131-135 referenced in a search result. In the present example, a network 260 connects the intermediary system 250 to the content. The client browser 240 may also be connected to the intermediary system 250 through a network. In one example, the client browser 240 is configured with a tunnel client service that is used to establish a network tunnel connection with the intermediary service 250.

The intermediary service 250 includes a metadata server 251 that injects metadata into content before the content is received by the client browser 240. The metadata server 251 gathers user behavioral data and transmits the user behavioral data to a collected behavioral data store 252. Examples of user behavioral data include information contained in the URL's and URL parameters of user network requests. Other examples of user behavioral data include the frequency of user network requests. For example, a high request frequency may indicate an active attempt to locate information.

The intermediary service 250 also includes a metadata generator 253 that analyzes and aggregates collected behavior data from the collected behavior store 252. The metadata generator 253 may identify averages, trends, and/or patterns in collected behavior data and populate a resource metadata store 254 based on such analysis. For example, the metadata generator 253 may identify that visitors to a first website often request a certain second website within one hour of requesting the first one. The system may store usefulness metadata for recommending the second site to visitors considering viewing the first site. In another example, the metadata server collects data based on device attributes and stores behavioral data in association with device attribute data so that a user's behavior can be associated with one or more attributes of the device that the user was using. The metadata generator 253 may analyze metadata according to device attributes in order to produce attribute-specific metadata, as is described in greater detail later.

In another example, users may set up accounts with the intermediary system 250, during which they may provide demographic data, device data, etc. that can be used by the system to assess resource utility for specific classes of users. In other examples, information, such as demographic information, is automatically determined for a user. One example of demographic information that the system may utilize is a user's behavioral similarity to other users. The system may thereby use user clustering in order to predict usefulness for one user, based on usefulness to another user. For example, a user who has had a high bounce back rate for certain pages may be predicted to find a particular hyperlink unhelpful, because other users with similar bounce back characteristics have exhibited behavior indicating that the hyperlink is unhelpful. In yet another example, the system identifies and classifies users according to regions, such as nation, zip code, or other regional area, and customizes usefulness metadata based on observed, aggregated regional characteristics.

The intermediary system 250 may gather behavioral data from one or more sources including: (1) collecting behavioral data by logging URL requests in association with information about the users and/or user devices, (2) receiving behavioral data from special browsers or browser plug-ins regarding additional types of user behaviors, such as touch screen panning, zooming behaviors, and eye tracking.

In one example, the metadata server 251 injects metadata onto pages as they are being retrieved by browser. In another example, the metadata server 251 interacts with a metadata-aware browser or browser plugin, and serves the metadata to the browsers or plugin for display on pages.

Figure 4:
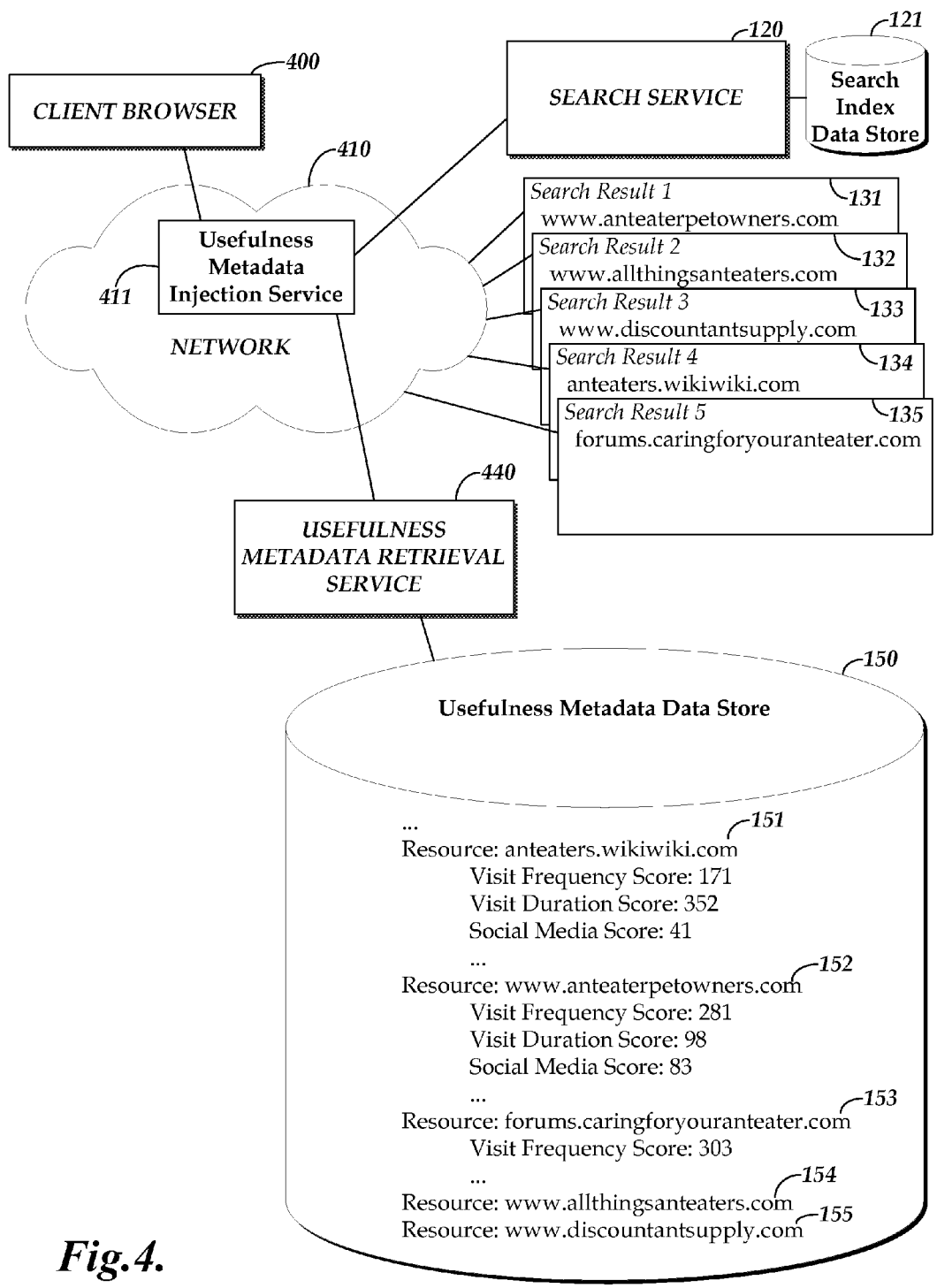
FIG. 4 depicts one embodiment of a system for providing usefulness metadata to the user of a client browser. A usefulness metadata injection service injects usefulness metadata into a resource before it is received by the client browser

Referring to FIG. 4, another embodiment of a system for providing usefulness metadata to the user of a computing device is shown. Here, the client browser 400 does not include a client usefulness metadata provision service or client behavioral data gather service, as the client browser 100 of FIG. 2a has. Instead, the system of FIG. 4 includes a usefulness metadata injection service 411 located within the network 410 and within the path between the client browser 400 and the search service 120. For example, the usefulness metadata injection service may be a proxy server through which the client browser 400 directs traffic. In another example, the usefulness metadata injection service 411 may operate at as a gateway computing device between the computing device operating the client browser, and the host computing device operating the search service 120. A usefulness metadata injection service residing on a gateway device may receive all traffic between the client browser 400 and search service 120 due to its location within a network topology.

A usefulness metadata injection service 411 may alter a network resource before the network resource is received by the client browser 400 in order to provide a user with usefulness metadata information. For example, the usefulness metadata injection service 411 may inject portions of HTML and/or JavaScript into a search result webpage in order to include usefulness metadata in the search result webpage. This may occur by collecting packets transmitted from the search service 120 to the client browser 400 and reassembling the HTML resource contained in those packets, then altering the HTML source code, and then transmitting the altered HTML source code to the client browser 400. As another example, the usefulness metadata injection service 411 may inject data related to usefulness metadata into other pages being reviewed and/or retrieved by a user. For example, the disclosure of U.S. Pat. No. 7,975,020 (the contents of which are incorporated by reference herein) provides one example of how panels or popovers may be added to arbitrary pages in connection with specific links. The usefulness metadata injection service may perform such injection transparently so that the client browser 400 believes the resulting, modified search result webpage was transmitted by the search service 120. For example, the usefulness metadata injection service may act as a TCP proxy service and transmit packets to the computing device executing the client browser with those packets containing a source IP address associated with the search service 120.

The usefulness metadata injection service 411 may also gather usefulness metadata and transmit that usefulness metadata to the usefulness metadata retrieval service 440. For example, the usefulness metadata injection service 411 may gather usefulness metadata related to transmissions from the client browser 400 indicating that the user has performed a social media action indicating some usefulness of a resource. As an example, the usefulness metadata injection service 411 may intercept one or more network packets with payload values indicating that the user has indicated that they like a particular website.

Usefulness Metadata Presentation Format

Figure 3:
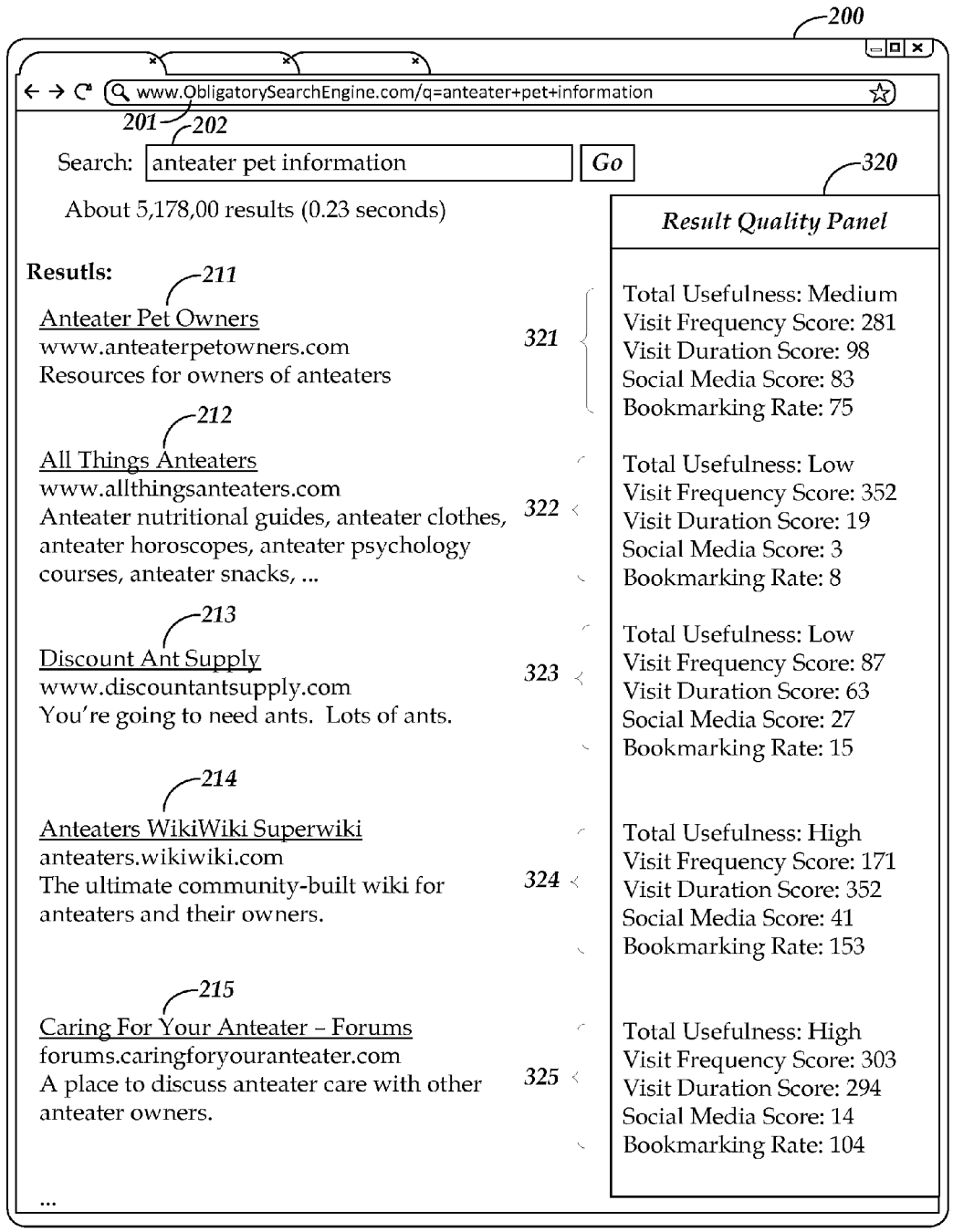
FIG. 3 illustrates another example of a graphical user interface with usefulness metadata for particular search result items listed on a search results page.

Referring to FIG. 3, an alternative embodiment is shown. This embodiment also provides usefulness metadata to the user of a network browser 200. Search results 211-215 are shown, and usefulness metadata is provided in a result usefulness panel 320. The result usefulness panel 320 appears alongside the search results and aligns usefulness metadata with its corresponding item, such as a hyperlink search result. For example, usefulness metadata associated with the network resource Anteater Pet Owner 211 is provided directly across 321 from the Anteater Pet Owner search result 211. The use of a result usefulness panel 320 may provide a user with usefulness metadata in a format that can be viewed and compared quickly. However, the result usefulness panel 320 of FIG. 3 uses more screen space than do the pop-up panels 221, 231 of FIG. 1.

The system may alternatively or additionally provide usefulness metadata in other formats. For example, the system may provide usefulness metadata in a browser startup page provided as a homepage, and/or a browser panel or toolbar area displayed alongside or above a page being viewed. In another example, a menu option may cause the system to show metadata for certain kinds of resources, such as search result pages, but hide it for other resources. In another example, the system may detect a user input action such as a multi-touch input, and provide a metadata overlay in response to the input. In another option, the system may modify the content of a resource by color coding hyperlinks according to usefulness. For example, hyperlinks of high expected usefulness may be color-coded green, while hyperlinks of low expected usefulness may be color-coded red.

Other Network Resource Items and Metadata Categories

In certain embodiments, a system provides metadata for an item referenced by a network resource, and the types of metadata provided depends on a category associated with the item. For example, referring to FIG. 5, an example user interface is displayed including metadata pop-up panels for various references in a webpage. An item identification service identifies an item electronically referenced on the page as being the subject of a user action. For example, in FIG. 5, the item identification service identifies that the user has performed a mouse-over action related to a phrase "CERN physicists discover particle consistent with Higgs boson" 510. The item identification service identifies that this refers to a news event, which is a type of item in the present embodiment. The system provides metadata related to the news event in a metadata popup panel 580. For example, the system lists the news category as being "Science" with a related hyperlink to other Science-related news articles. The system also provides item metadata in the panel 580 concerning the number of other news articles that are related to the Higgs boson discovery news event, and links to the most popular of those articles, and a list of all such articles. The system may determine metadata such as popularity through gathering and/or intercepting user actions and device transmissions related to device requests for news articles that have been categorized as describing the particular news event item.

The system may include categorization data that associates categorization factors with a particular item category. For example, keywords may be used to identify articles as likely relating to news events. The system may analyze a network resource, such as by parsing HTML source code, and identify the presence of keywords. Such identification may be used as a factor making it more likely that the system will categorize the particular event in the news category associated with the factor. As another example, the categorization data store may include a listing of domain names associated with a particular category, such as a news category. Additionally, image recognition factors may be used in order to categorize image items into particular categories.

In the present embodiment, the system stores metadata regarding news event items in a metadata store. The system separately identifies multiple unique news event items, such as a particular event reported on by multiple news organizations on multiple network servers. In one example, the system gathers data from user browsing activity, including parsing news article text 511 located at different network locations and heuristically determines whether two articles relate to the same event using keyword matching and word frequency comparisons. The system may also consider a network resource's creation date, such as a file's creation metadata date, in associating two network resources with the same news event item.

The system may also analyze a URL 501 associated with a network resource in classifying it into one or more item categories. The system may also analyze a URL in order to assign particular metadata to a categorized item. For example, after the system has classified an item, such as a hyperlink, as a news event item the system may analyze a URL associated with the item in order to determine what value to populate a metadata field with, such as what news event identification number to use for the item. A news event identification number may uniquely identify a particular news event. In another example, the system categorizes an item as a product by storing data associated with a product category, and further associates a record corresponding to the item with a unique product identification number corresponding to the product.

Figure 5:
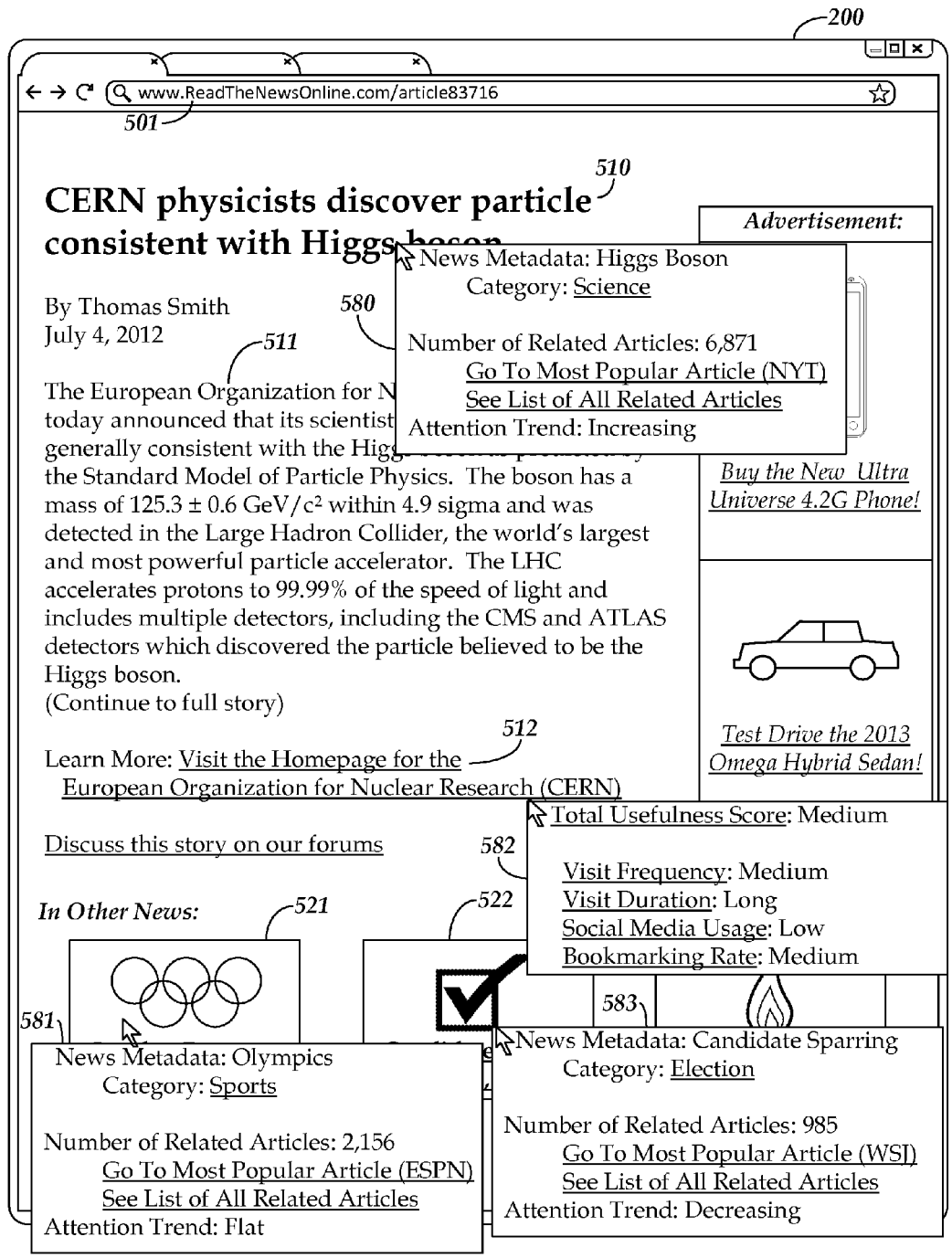
FIG. 5 illustrates one example of a graphical user interface with usefulness metadata for links contained within a news article webpage resource. The example also illustrates item category-based metadata.

The system corresponding to the graphical user interface of FIG. 5 provides usefulness metadata 582 related to a network resource, the homepage for the European Organization for Nuclear Research 512. The provided usefulness metadata in the present illustration relates specifically to the destination of the hyperlink, rather than to the specific hyperlink itself. In other embodiments, different hyperlinks to a single destination are associated with different usefulness metadata. For example, the system may record data indicating that visitors to one website find a second website to be more useful, as compared to visitors of a third website finding the second website to be less useful.

The present embodiment also provides metadata related to other items that have been categorized as news event items. The system is capable of identifying an image 521 as relating to the Olympics as a news event, of a sports category 581. The system is also capable of identifying a different image as related to candidate sparring within an elections category. Metadata provided for the news item examples include trending information 580-583. The system presents metadata indicating whether a particular news event is receiving an increasing amount of attention from users, a flat amount of attention from users, or a decreasing amount of attention from users. For example, the system may determine an attention trend value by comparing historic visit frequency and/or visit duration against a more recent quantity of visit frequency and/or visit duration. Alternatively or additionally, the system may calculate a rate of change for visit frequency and/or visit duration.

Figure 6:
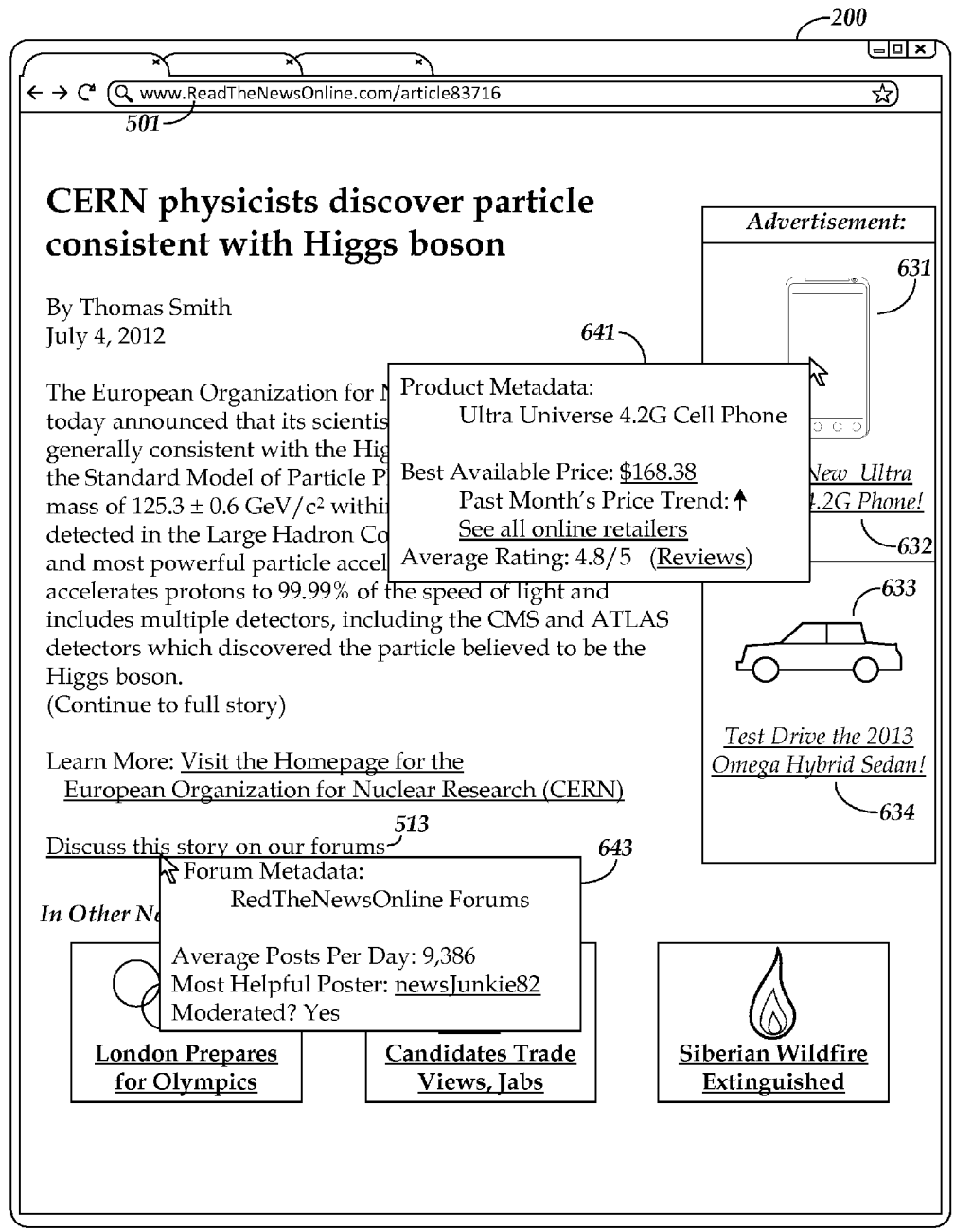
FIG. 6 illustrates another example of a graphical user interface with category-based metadata. In this example, metadata for a product item category, and metadata for a forum item category are shown.

Referring to FIG. 6 another graphical user interface is illustrated with additional metadata provided by the system. In the present illustration, the system categorizes an item referenced within a network resource as a product item and provides product metadata based on that categorization. For example, the system has identified an image of a cellular phone 631 as being the Ultra Universe 4.2G Cell Phone. The system has classified this item as fitting within a product category. The system gathers and provides different types of metadata for items categorized into the product category than it does for items categorized into other categories. In this example, the system provides pricing metadata, pricing trends, a reference to a list of online retail outlets selling the product, an average rating, and a reference to reviews for the product 641. In one example, the system obtains pricing data from one or more electronic catalogs. In another example, the system includes a product search service that searches for retailers offering the product, and then gathers and aggregates pricing information related to those retailers' offering of the product.

The system may keep historic pricing information that may be used to determine pricing trend metadata. The illustrated system may also identify a hyperlink 632 associated with the Ultra Universe 4.2G Cell Phone, with the product item itself. The system may therefore provide the user with the same product metadata when the system detect a mouse-over event for the product image 631 as when the system detects a mouse-over event for the product text 632. The system may identify other images and text as corresponding to the same product, despite those images and text appearing on other network resources. The system may therefore provide the same, or similar, product metadata to a user when the user is viewing an image of the same product in the context of a different network resource.

The present embodiment also classifies certain items as forum items. For example, the system has classified a hyperlink 513 as a forum item, and provides forum metadata 643 in response to detecting a user input event associated with the hyperlink. The system stores forum metadata including the name of the network forum that the hyperlink is associated with, an average number of posts per day on the forum, the name of the most helpful poster on the network forum and a hyperlink to a profile page associated with that user, and information regarding whether the forum is moderated. The system may scan network resources associated with the network forum in order to gather one or more of these pieces of information. In another example, the system may communicate with an application programming interface associated with the network forum in order to obtain forum metadata.

Device Attributes

In another embodiment, the system provides usefulness metadata based in part on one or more attributes a user computing device. For example, the system may provide one set of usefulness metadata related to a hyperlink when the search result and usefulness metadata are provided to a desktop computing device, as compared to when the search result and usefulness metadata are provided to a smartphone computing device. Examples of device attributes include display resolution, processing power, total random access memory, available random access memory, graphical processing power, available network bandwidth, and supported network protocols. Other examples of device attributes include the presence or absence of certain software functionality, such as Adobe Flash player, a Java Runtime Environment, Microsoft Silverlight, or an HTML5-capable client. Other examples of device attributes include the presence or absence of a particular language pack or font. In one embodiment, the system provides metadata for a link where the metadata notifies the user that the target resource of the link is a Flash file, or a page including a Flash file, and that Flash is not supported by the user's device. In another example, the system provides metadata based at least in part on a user's preferred language. For example, the system may detect, or the user may select, a preferred language. The system may identify the primary language used in the target of a particular hyperlink and inform the user of the hyperlink's expected usefulness based on that detected language, and the user's preferred language.

Figure 7:
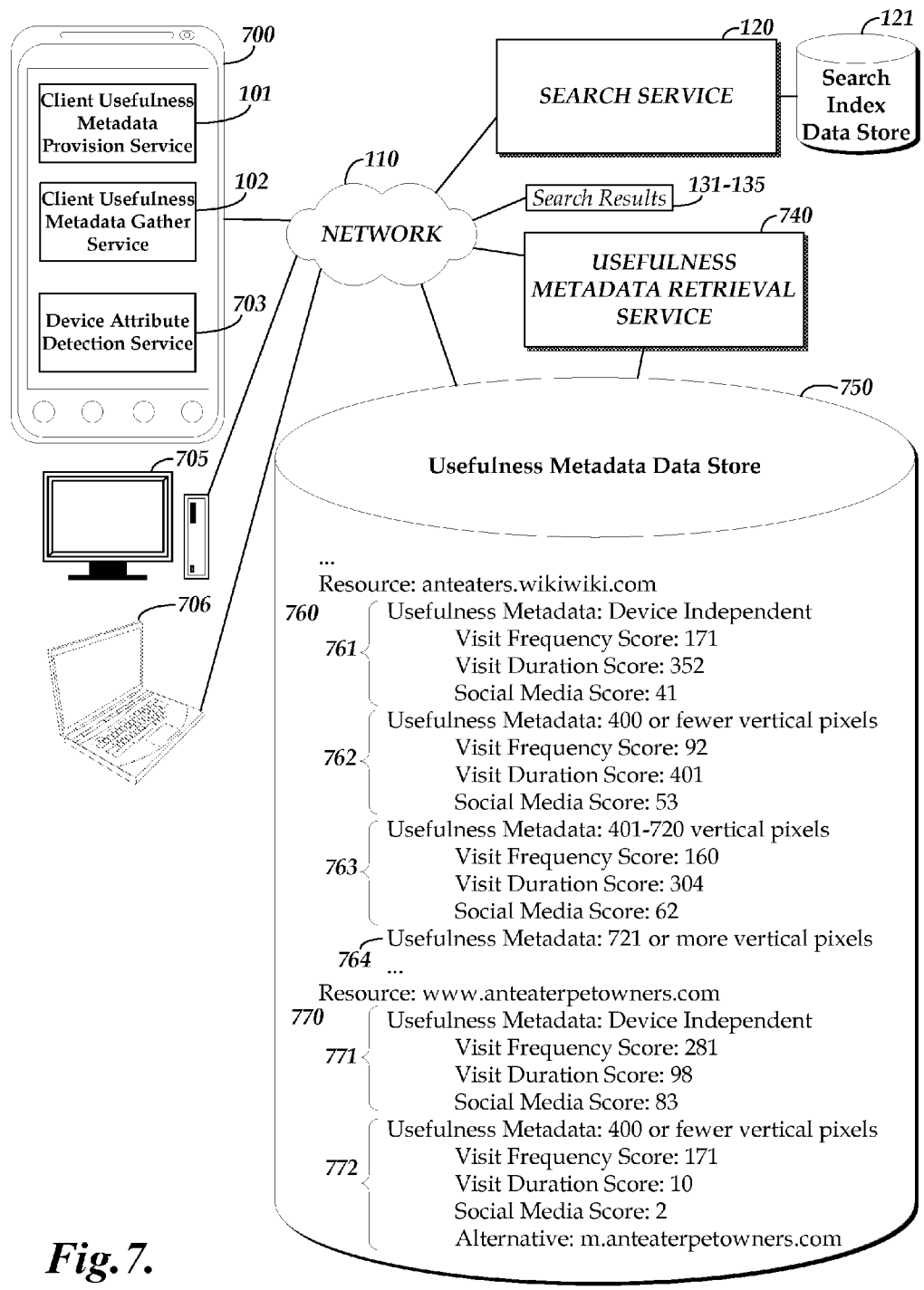
FIG. 7 depicts an embodiment of a system for providing usefulness metadata to the user of a client browser based at least in part on attributes of the user device associated with the client browser.

Referring to FIG. 7, there is shown an embodiment of a system for providing usefulness metadata to the user of a computing device based at least in part on a detected attribute of the computing device. Examples of computing devices include desktop computers, laptop computers, other personal computers, tablets, personal digital assistants, smartphones, console devices, smart televisions, and gaming consoles. In the present example, a mobile computing device 700 includes a client usefulness metadata provision service 101 that provides a user with usefulness metadata consistent with previous discussions including graphical user interface modification. The mobile computing device 700 also includes a device attribute detection service 703. In this example, the device attribute detection service 703 detects one or more attributes of the device that is executing it. For example, the device attribute detection service 703 may poll a configuration setting of the computing device 700, may perform an attribute evaluation process on the computing device 700 by simulating a burdensome process, or may provide a user interface prompting user to provide certain device attribute information. In one example, the system obtains some types of device attributes from the device's URL requests. The system may provide usefulness metadata despite the absence of a client-side device attribute detection service.

The present embodiment also includes a usefulness metadata data store 750. In this example, the usefulness metadata store 750 associates a device attribute factor with usefulness metadata. For example, the usefulness metadata data store 750 stores data associated with the resource anteaters.wiki-wiki.com 760. That metadata is further organized according to usefulness metadata corresponding to different device attribute factors. The system includes usefulness metadata associated with devices with the attribute factor of having 400 or fewer vertical pixels 762. The system also includes usefulness metadata associated with devices with the attribute factor of having between 401 and 720 vertical pixels 763. The system includes usefulness metadata associated with devices with the attribute factor of having 721 or more vertical pixels 764.

In another example, the behaviors of users of particular device types (e.g., smartphones, iPhones, laptops, etc.) can be monitored in connection with a given resource to assess whether that resource is well suited for display on such devices. As one example, if users of smartphones engage in significant zooming/panning during viewing of a particular page, the system may treat that behavioral data as an indication that the page is not well suited for display on smartphones. As another example, the system may monitor users' access durations and associate that behavioral data with certain device attributes. For example, if users of smartphones have significantly shorter access durations than other users, the system may treat that behavioral data as an indication that the page is not well suited for display on smartphones.

In other examples, the system organizes usefulness metadata according to more than one device attribute. In another example, the system associates a multiplier with a particular device attribute factor. For example, the system may store a single total usefulness score for a particular resource, and may also store a resolution-sub-400vertPx multiplier with a value of 0.5. The system may calculate the total usefulness of the resource for the user of a device with fewer than 400 vertical pixels by multiplying the total usefulness score by the resolution-sub-400vertPx multiplier. Other methods, such as other mathematical algorithms, may additionally or alternatively be used to provide a user with usefulness metadata based at least in part on a device attribute of a computing device.

The embodiment of FIG. 7 also stores device-independent usefulness metadata. The device-independent usefulness metadata is not associated with a particular device attribute. This metadata may be useful to users of many different devices, although it may be of less specific use than attribute based usefulness metadata. In one example, the device-independent usefulness metadata is determined as a function of device-specific usefulness metadata. In another example, device-independent usefulness metadata is gathered from computing devices which do not provide attribute information to the usefulness metadata retrieval service.

In the present example, the client usefulness metadata provision service submits a query to the usefulness metadata retrieval service 740 identifying both an item and a computing device attribute associated with the computing device 700. The usefulness metadata retrieval service 740 retrieves usefulness metadata from the usefulness metadata data store 750 based on both the resource and the device attribute. For example, the usefulness metadata provision service may identify the anteaters.wikiwiki.com resource and a vertical pixel resolution of 400. The usefulness metadata retrieval service transmits a query corresponding to those values, and responds to the client usefulness metadata provision service's request with metadata indicating a visit frequency score of 92, a visit duration score of 401 and a social media score of 53. The client usefulness metadata provision service may then provide that usefulness metadata to the user. A client usefulness metadata provision service operating on a different device 705, 706 may provide different usefulness metadata associated with the same resource, for example due to the device 705, 706 having a different vertical pixel resolution.

Figure 8:
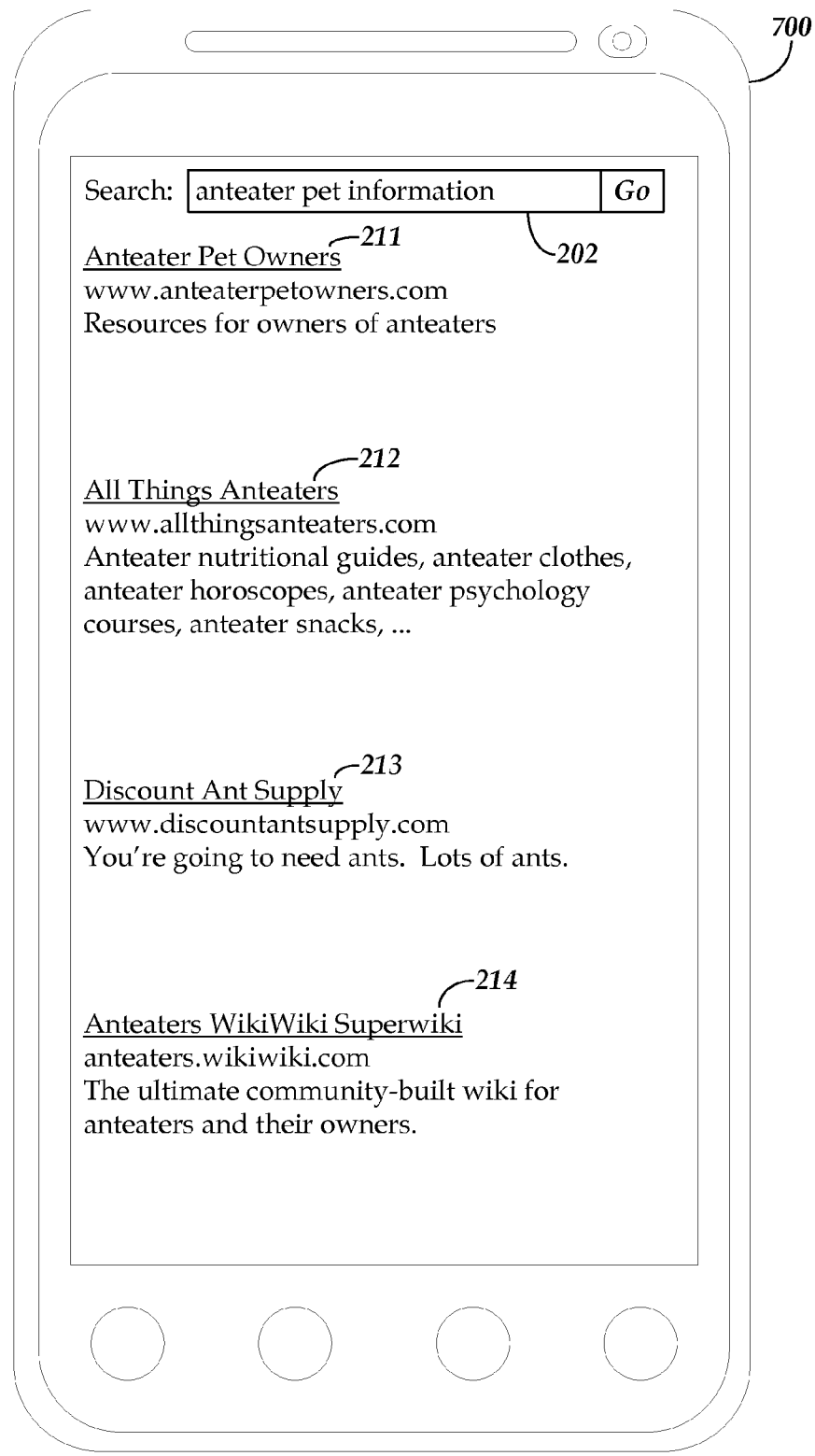
FIG. 8 illustrates a prior art graphical user interface of a client device.

Referring to FIG. 8, an illustration is shown of a client browser operating on a mobile computing device 700. The client browser displays a network resource including search results 211-214 based on a search string 202. In contrast, FIG. 9 illustrates an embodiment as described herein where usefulness metadata is provided. The system provides usefulness metadata based on at least one attribute of the computing device 700. The system indicates that this usefulness metadata is based at least in part on an attribute of the mobile device by referring to the data as "Usefulness for Your Device" 911 as an example. The present embodiment also provides a general usefulness score 912, which may be device-independent metadata. The illustrated embodiment also provides information to the user identifying that, for a particular network resource Anteater Pet Owners 211, the system has identified that an alternate version of the network resource exists 913, with the alternate version optimized for the computing device 700. The "Alternate Version Optimized for Your Device" represents a hyperlink to a URL 914 associated with the optimized version. The system identifies that the alternate version has a different expected usefulness for the user's device 914 as compared to the version 211 of the network resource that was provided by the search result. For other search result network resources 212-214, device-based usefulness metadata 921, 931, 941 is provided in addition to device-independent usefulness metadata 922, 932, 942.

CONCLUSION

The system 100, 101, 102, 140, 400, 411, 440, 700, 703, 705, and 706 may be implemented as computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state.

Each of the services 101, 120, 140, 400, 411, 440, 703, 740 shown in FIGS. 2, 4, and 7 may be implemented in an appropriate combination of computer hardware and software, or in application-specific circuitry. For example, each such service may be implemented in service code executed by one or more physical servers or other computing devices. The service code may be stored on non-transitory computer storage devices or media. The various data repositories 150, 750 may include persistent data storage devices (hard drives, solid state memory, etc.) that store the disclosed data, and may include associated code for managing such data.

Although the inventions have been described in terms of certain preferred embodiments, other embodiments will be apparent to those of ordinary skilled in the art, including embodiments that do not include all of the features and benefits set forth herein. Accordingly, the invention is defined only by the appended claims. Any manner of software designs, architectures or programming languages can be used in order to implement embodiments of the invention. Components of the invention may be implemented in distributed, cloud-based, and/or web-based manners.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

What is claimed is:

1. A system for providing resource metadata to browser users, the system comprising:

a computer system comprising one or more computing devices and a non-transitory storage medium, said computer system configured to serve as an intermediary between user computing devices and content sites, and to request network resources, including pages, on behalf of the user computing devices in response to requests from the user computing devices, the computer system programmed to implement a process that comprises:

collecting behavioral data reflective of user interactions with particular network resources, said behavioral data based, at least, on said requests from the user computing devices, said behavioral data including data reflecting a plurality of different categories of user behavior, wherein collecting the behavioral data comprises storing the behavioral data in association with user device attribute information;

generating, for a particular network resource, based at least partly on the collected behavioral data, metadata reflective of the usefulness of the network resources to users, said metadata comprising a plurality of ratings of the network resource, each rating corresponding to a different one of the categories of user behavior, wherein generating the metadata comprises using the user device attribute information to generate separate ratings of the network resource for each of a plurality of user device categories; and provide the metadata, including the plurality of ratings of the network resource, for display to the browser users in association with links to the corresponding network resource, to thereby assist users in determining whether to access the network resource.

2. The system of claim 1, wherein the metadata is based at least partly on visit durations of users.

3. The system of claim 1, wherein the computer system is programmed to inject the metadata into pages being retrieved by the user computing devices.

4. The system of claim 1, wherein the computer system is programmed to provide to the browser users personalized metadata that is dependent upon the types of computing devices used by such users.

5. The system of claim 1, wherein the computer system is programmed to provide to the browser users personalized metadata that is dependent upon demographic information of such users.

6. The system of claim 1, wherein the behavioral data includes data regarding zooming and panning actions performed by users during viewing of pages, and the metadata reflects the zooming and panning behaviors.

7. The system of claim 1, wherein the particular network resource is a content page, and the plurality of ratings includes a visit duration rating that is based on a measure of amounts of time spent by users viewing the content page.

8. The system of claim 1, wherein at least one of the user device categories is a mobile device category.

9. The system of claim 8, wherein generating the plurality of ratings comprises generating a rating representing a suitability of the network resource for viewing on devices in said mobile device category, said rating representing suitability based at least partly on zooming actions performed on the network resource with devices falling in the mobile device category.

10. The system of claim 1, wherein the computer system is responsive to a request from a user device for a page that includes a link to the network resource by at least:

determining a user device category of the user device;

determining a rating of the network resource, said rating being specific to said user device category; and outputting an indication of said rating to the user device for display in association with the link.

11. The system of claim 1, wherein the plurality of categories of user behavior includes categories that are based on user device attributes of the user computing devices.

12. The system of claim 1, wherein the plurality of categories includes a category based on bookmarking behaviors of users.

13. The system of claim 1, wherein the plurality of categories includes a category based on social media behaviors of users.

14. Non-transitory computer storage having stored thereon program instructions that direct a computing system to perform a process that comprises:

collecting behavioral data reflective of user interactions with a first network-accessible page, said behavioral data including data reflecting a plurality of categories of user behavior, wherein collecting the behavioral data comprises storing the behavioral data in association with user device type information;

generating metadata for the page based on the collected behavioral data, said metadata including a plurality of ratings of the first page, each of which corresponds to a different respective one of the categories of user behavior, wherein generating the metadata comprises generating, for each of a plurality of user device categories, a rating representing a suitability of the first page for viewing on user devices falling within the respective user device category;

receiving a request from a user device for a second network-accessible page that includes a link to the first network-accessible page; and in response to the request, outputting to the user device at least some of the plurality of ratings.

15. The non-transitory computer storage of claim 14, wherein outputting at least some of the plurality of ratings comprises injecting an indication of the plurality of ratings into the second page.

16. The non-transitory computer storage of claim 14, wherein outputting at least some of the plurality of ratings comprises:

identifying a subset of the ratings that are relevant to the request; and outputting only the subset of the ratings, such that less than all of the ratings are output to the user device.

17. The non-transitory computer storage of claim 14, wherein the plurality of categories of user behavior includes a category that is based on visit duration.

18. The non-transitory computer storage of claim 14, wherein the plurality of categories of user behavior includes at least one category that is based on user device attributes.

19. The non-transitory computer storage of claim 14, wherein the plurality of categories of user behavior includes a category based on bookmarking behaviors of users.

20. The non-transitory computer storage of claim 14, wherein the plurality of categories of user behavior includes a category based on social media behaviors of users.

21. The non-transitory computer storage of claim 14, wherein generating the metadata comprises using recorded zooming behaviors of mobile device users to generate a rating representing a suitability of the first page for viewing on mobile devices.

* * * * *